United States Patent [19]

Reinecke

[11] 3,979,021
[45] Sept. 7, 1976

[54] SYSTEM FOR DOSING A VISCOUS HARDENABLE MASS INTO A SUCCESSION OF CONTAINERS

[75] Inventor: Günter Reinecke, Wuppertal-Elberfeld, Germany

[73] Assignee: Benz & Hilgers GmbH, Dusseldorf, Germany

[22] Filed: Mar. 27, 1975

[21] Appl. No.: 562,870

[30] Foreign Application Priority Data
Mar. 29, 1974 Germany............................ 2415237

[52] U.S. Cl.................................. 222/1; 141/158; 141/248; 222/146 H; 222/217; 222/255; 222/318; 222/381
[51] Int. Cl.² ........................................ B67D 5/52
[58] Field of Search ........... 222/275, 278, 279, 381, 222/217, 255, 1; 141/248, 160, 186

[56] References Cited
UNITED STATES PATENTS

| | | | |
|---|---|---|---|
| 2,972,435 | 2/1961 | McCarty ........................ | 222/381 X |
| 3,322,167 | 5/1967 | Rosen ............................ | 141/248 X |
| 3,583,603 | 6/1971 | Freckmann et al............. | 222/381 X |

Primary Examiner—Stanley H. Tollberg
Assistant Examiner—John P. Shannon
Attorney, Agent, or Firm—Ernest G. Montague; Karl F. Ross; Herbert Dubno

[57] ABSTRACT

A housing has a compartment subdivided by a pair of sleeve valves into an input compartment to which is continuously fed a stream of viscous hardenable material and an output compartment arranged adjacent a transport device which step-wise advances a succession of containers. Each of these sleeve valves has a central piston and has a valve port that can be directed either into the input compartment or the output compartment. Thus one of the sleeves is turned with its port toward the input compartment and its piston is retracted to draw into the sleeve a predetermined quantity of the viscous mass. Thereupon the sleeve is rotated through 180° and this portion is discharged into the output compartment and thence into one of the containers. While this one sleeve is turning and discharging the other sleeve is turned toward the input compartment and is itself drawing in a second portion of hardenable mass which it subsequently discharges into the output compartment as the first sleeve again draws in a portion. One wall of the input compartment is formed by a loaded piston that normally covers an overflow opening so that if the input feed increases above a predetermined level the piston will be displaced to uncover this overflow opening and allow the hardenable mass to flow out of the housing.

8 Claims, 3 Drawing Figures

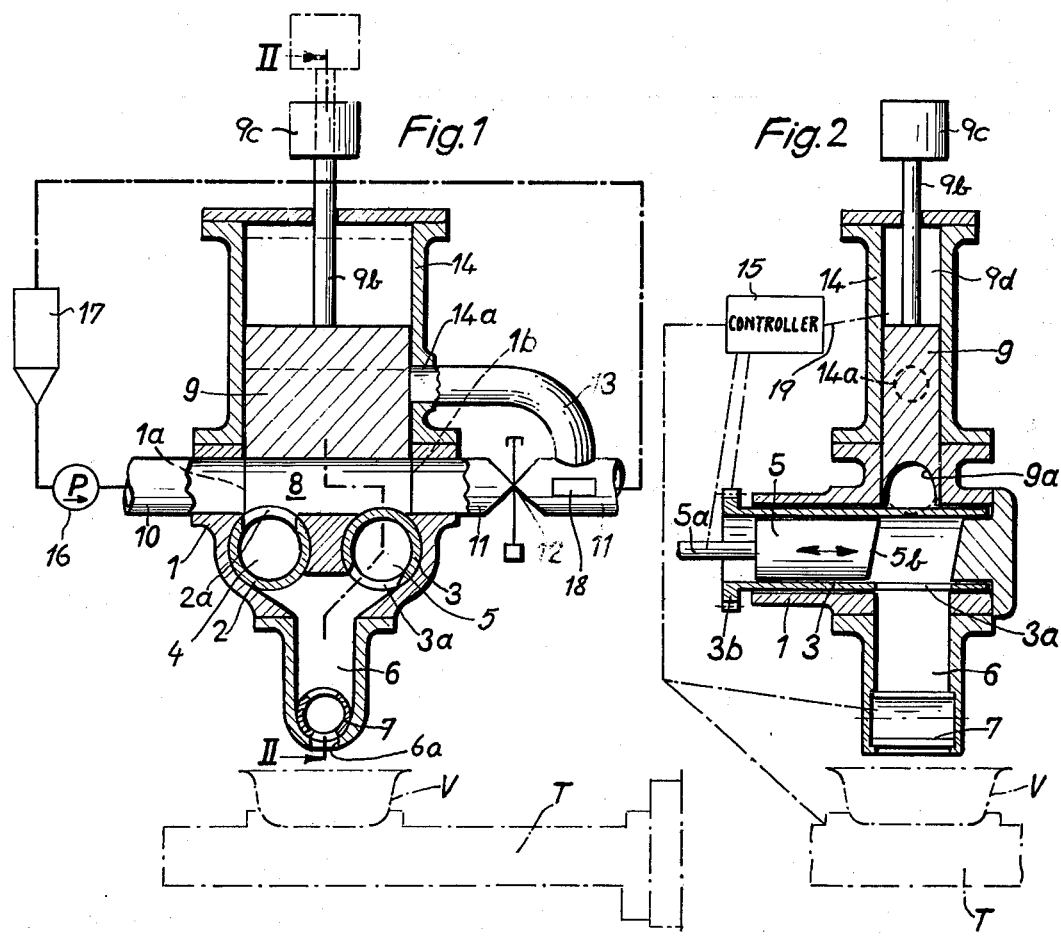
Fig.1
Fig.2
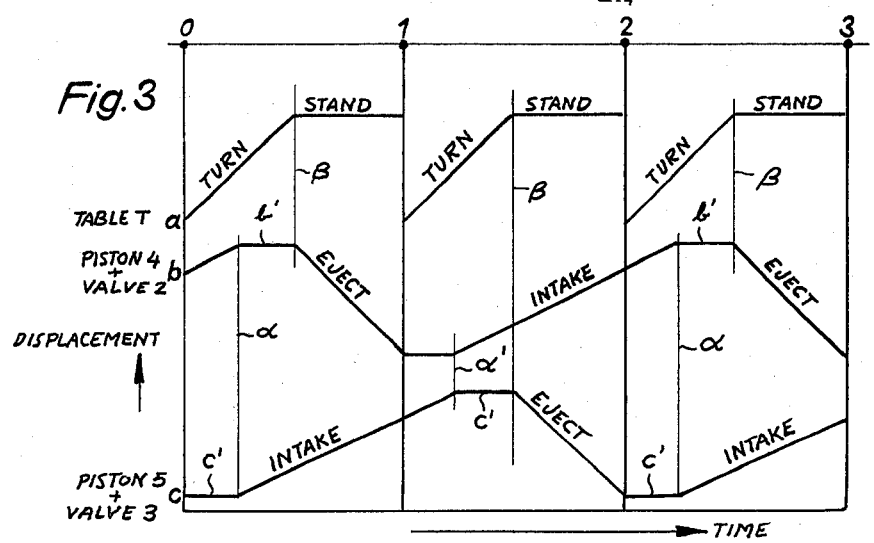
Fig.3

SYSTEM FOR DOSING A VISCOUS HARDENABLE MASS INTO A SUCCESSION OF CONTAINERS

FIELD OF THE INVENTION

The present invention relates to a method of and apparatus for dosing viscous material. More particularly this invention concerns a system which receives a continuous flow of a viscous material and feeds uniform doses of this material to a succession of containers.

BACKGROUND OF THE INVENTION

In the packaging of butter, margarine, soft cheese, and the like it is necessary that the viscous mass be loaded as quickly as possible into the containers it is to be packaged in. If the mass is allowed to stand it quickly hardens; indeed some types of margarine can solidify in a period of several seconds if left quiescent.

A known device has a filling funnel or hopper into which the viscous mass is poured from a producing machine. At the bottom of the hopper one or more dosing valves is provided to pull off predetermined quantities of the mass and eject it from the funnel into a container. The operation is carried out as fast as possible in order to prevent the material from settling and hardening in the hopper. In addition extremely careful design of the hopper is necessary in order to prevent dead corners or the like in the apparatus from filling up with hardened material.

Typically in such a device it is known to provide a pair of valve sleeves which have at one side a valve port that can be turned either toward the interior filling funnel or toward the container to be filled. Each of these valve sleeves has a respective piston and the two pistons are linked together, as well as the two valves so that they have simultaneous intake strokes which draw a quantity of the mass out of the funnel, and then both of the sleeves are turned over and the pistons are advanced so as to eject both of these quantities from the tubes into respective containers. Although such a system operates relatively rapidly it still has the disadvantage that between strokes of the pistons the material has a chance to settle and, therefore, harden. In addition any breakdown along the production line can cause the entire batch to be lost, or at least require it to be scooped out of the funnel and replaced in the processing device.

OBJECTS OF THE INVENTION

It is therefore an object of the present invention to provide an improved dosing apparatus and method.

Yet another object is the provision of a system which can transform a continuously arriving stream of a viscous mass into a succession of doses of uniform size that can be charged into respective packages.

Yet another object is the provision of a system wherein a breakdown in operations, for example a failure in the supply of containers to be loaded, does not require the entire operation to be shut down and the dosing device to be cleaned and otherwise serviced.

SUMMARY OF THE INVENTION

These objects are attained according to the present invention in an apparatus having a housing provided with an intake opening to which the viscous mass is continuously fed and having an output opening turned toward a transport means that displaces a succession of containers step-wise past this output opening. A pair of sleeve valves are provided in the chamber subdividing the chamber into an intake chamber at the intake opening and an output chamber at the output opening. Each sleeve valve has a hollow interior and a valve port and each of these valves is rotatable between an intake position with its port opening into the intake compartment and an output position with its port opening into the output compartment. A piston is reciprocal in each of the sleeve valves between a retracted position defining in the respective valve a predetermined volume and an advanced position substantially filling the interior of the respective valve. Control means is provided for retracting one of the pistons and thereby withdrawing from the input compartment a first portion of a mass of predetermined volume. This first portion is then segregated in the intermediate compartment formed by the one sleeve valve and the sleeve valve is turned into the output position and the first position is ejected from the intermediate compartment into the output compartment. Simultaneous with this latter ejection operation a second portion is withdrawn from the input compartment by retraction of the piston of the other valve and the second portion is then segregated in the second intermediate compartment of the other valve. At the same time there is ejected from the output compartment a dose of the mass of predetermined volume into one of the containers. Thereafter the second portion is ejected from the second intermediate compartment into the output compartment while simultaneously the now empty first valve sleeve is turned around and its piston is retracted to draw another portion out of the input compartment and at the same time another dose is ejected from the output compartment into another container.

Thus in accordance with present invention the mass in the input compartment is continuously moving. This is particularly effected according to the present invention by terminating withdrawal of the first portion at approximately the same instant as the withdrawal of the second portion commences, and vice versa. Thus the mass in the input compartment never settles and has no chance to harden.

In accordance with yet another feature of this invention the volumetric capacities of both of the sleeve valves are identical to each other and to the volumetric capacity of the input compartment. In addition the pistons are alternately reciprocated at rates controlled so that all of the steadily incoming viscous mass is drawn off.

According to yet another feature of this invention the housing is provided with a piston forming one wall of the input compartment and normally urged into a position wherein said input compartment has a minimum volume, but displaceable from this minimum-volume position toward a maximum-volume position wherein the volumetric capacity of the compartment is substantially greater. Means is provided for urging the piston into the minimum-volume position so that in case the input flow rate increases above a predetermined level the piston will be forced back and the volume of the input compartment will be increased. In accordance with yet another feature of this invention there is provided within the wall of the housing an overflow opening which is covered by the piston in its minimum-volume position but uncovered and opening into the input compartment when the piston is in its maximum-volume position. This overflow opening is connected back through a heated conduit to the processing apparatus for the mass being dosed. Thus if the input flow rate increases much beyond a predetermined level the overflow opening will be uncovered by the piston and the excess mass will be able to flow back into the processing device. In this manner breakdowns in the apparatus do not require the entire production line to be shut down. This feature is particularly interesting where several such dosing devices are connected to a single processing apparatus.

According to a further feature of this invention the flow cross section of input chamber, of each of the valves, and of the output chamber are all substantially alike so that no dead spots are created and a constant flow is insured.

BRIEF DESCRIPTION OF THE DRAWING

The above and other objects, features, and advantages of the invention will become more readily apparent from the following description, reference being made to the accompanying drawing, in which:

FIG. 1 is a vertical longitudinal section through the apparatus according to the present invention with some parts shown diagrammatically;

FIG. 2 is a section taken along line II—II of FIG. 1; and

FIG. 3 is a graph illustrating operation of the apparatus shown in FIGS. 1 and 2.

SPECIFIC DESCRIPTION

The dosing apparatus according to the present invention comprises a housing 1 in which a pair of parallel cylindrical valve tubes or sleeves 2 and 3 are rotatably received. The tubes or sleeves 2 and 3 have respective valve ports 2a and 3a and are provided internally with respective pistons 4 and 5. FIG. 2 shows how the sleeve 3 is provided at its outer end with a pinion 3b and how the piston 5 has a piston rod 5a and a slanted front face 5b. The sleeve 2 and piston 4 are similarly formed. Above the valve sleeves 2 and 3 there is an inlet compartment 8 connected via a conduit 10 having a downstream end 1a to a pump 16 in turn connected to the hopper 17 of a margarine-processing machine. The compartment 8 is elongated and perpendicular to the sleeves 2 and 3 and has a downstream end 1b connected to a conduit 11 provided with a pneumatically operated valve 12 which is normally closed during operation of the machine.

The upper wall of the compartment 8 is formed by a semicylindrical concavity 9a formed in the bottom of a piston 9 vertically reciprocal in a cylinder 14 formed in the housing and having a piston rod 9b on whose upper end is carried a weight. The compartment 9d above the piston 9 may be connected via a line 19 to a controller 15 for pressurization with air. An overflow opening 14a is connected via a bypass conduit 13 to the conduit 11 which in turn feeds back to the hopper 17. A heater 18 is provided in the conduit 11 to insure that the viscous mass fed in through opening 1a and passing out of the chamber 8 either through the hole 1b or the opening 14a remains fluent on its way back to the hopper 17.

Below the valve sleeves 2 and 3 the housing 1 is formed with an output compartment 6 provided on its lower end with a valve 7 of the rotary type. The chamber 6 has an outlet opening 6a positionable above a container V carried on a turntable T which carries a succession of such containers V and is indexed rotationally by the controller 15 which also is connected to the valve sleeves 2 and 3, the valve 7 and the pistons 4 and 5.

The device functions as follows:

The pump 15 operates continuously so that a uniformly incoming stream of viscous but still fluent margarine is fed into the compartment 8 via the inlet hole 1a. If no filling is to take place the valve 12 is left open and the liquid margarine is merely recirculated back into the hopper 17.

Once, filling is to start the sleeves 2 and 3 are positioned as shown in FIG. 1, with the port 2a opening into the input chamber 8 and the port 3a into the output chamber 6. The piston 4 of the sleeve 2 is then withdrawn as indicated at line b of FIG. 3 to draw in a predetermined volume of margarine. Thereafter in the time interval between instant α and instant β, as indicated at b' in FIG. 3 the sleeve 2 is rotated. Then, at instant β the piston 4 is again advanced so as to eject the portion of margarine into the outlet compartment 6. The turntable T is brought to standstill as indicated at line a in FIG. 3 and the valve 7 is open during this ejection operation.

Meanwhile the sleeve 3 has been rotated during time c', as indicated at line c in FIG. 3, so that starting at instant α this position 5 is retracted so as to draw into the intermediate compartment inside this sleeve 3 another portion of margarine.

The ejection operation of piston 4 is terminated at a time 1 and between time 1 and α the sleeve 2 is again rotated back into the input position with the port 2a turned the input compartment 8. The valve 7 is closed at time 1 and the turntable T is turned starting at time 1. At the same time the intake stroke of the piston 5 continues past time 1 to time α' at which instant the piston 5 is fully retracted. At this instant α' the piston 4 starts to retract and another intake cycle of this piston is commenced. Meanwhile starting at time α', during a time c, the sleeve 3 is rotated through 180 until a time β' whereupon the turntable T is again arrested and the valve 7 is again opened, and the piston 5 is advanced to eject the mass inside the sleeve 3 into the chamber 6. Thereafter the above operations are repeated one after the other.

The flow cross sections of the chamber 8 and of the valve sleeves 2 and 3, as well as of the output compartment 6 are all identical so that a constant smooth flow through the device is insured, and one of the margarine in the housing 1 stands still.

Should for some reason the input speed increase the piston 9 will be forced up in the chamber 14 until it reaches the dot-dash line position of FIG. 1 whereupon it uncovers the overflow opening 14a. At this time the excess flow will be shunted by the bypass conduit 13 back to the heated conduit 11 and to the hopper 17. Compressed air may be fed via line 19 to the chamber 9d should it be desired to increase the pressure exerted by the piston 9 on the mass of margarine.

The device according to the present invention therefor allows the containers V to be filled at a very rapid rate. In addition due to the particular construction of the device the possibility of the margarine hardening in the housing is almost completely eliminated, as even when the device is not filling the container the margarine is merely passed through the housing and automatically back into the hopper.

I claim:

1. An apparatus for receiving a continuously advancing stream of a viscous mass that hardens when quiescent and for producing periodic and uniform doses of said mass, said apparatus comprising:
- a housing having a chamber provided with an intake opening receiving said continuously advancing stream of said mass and an output opening;
- a pair of sleeve valves in said chamber subdividing said chamber into an intake compartment at said intake opening and an output compartment at said output opening and each having a hollow interior and a valve port, said valves each being rotatable between an intake position with its port opening into said intake compartment and an output position with its port opening into said output compartment;
- a respective piston reciprocating in each of said sleeve valves between a retracted position defining in the respective valve a predetermined volume and an advanced position substantially filling the interior of the respective valve, whereby reciprocation of a piston in a suction stroke from said advanced position into said retracted position with the respective sleeve valve in said intake position draws a predetermined quantity of said mass having said predetermined volume into the respective sleeve valve and reverse reciprocation in an ejection stroke with the respective sleeve valve in said output position injects said predetermined quantity into said output compartment; and
- control means for holding one of said sleeve valves in said intake position generally while holding the other sleeve valve in said output position and for periodically reversing the positions of both of said sleeve valves.

2. The apparatus defined in claim 1 wherein said intake compartment, said sleeve valves, and said output compartment are all of substantially identical flow cross section.

3. The apparatus defined in claim 2, further comprising a valve at said output opening and connected to said control means for allowing flow out of said output opening only during advance of either of said pistons from said retracted positions into said advanced positions.

4. The apparatus defined in claim 2, further comprising a further piston in said housing having a face forming a wall of said intake compartment and reciprocating between a minimum-volume position wherein said input compartment is of minimum volumetric capacity and a maximum-volume position wherein said input compartment is of substantially greater volumetric capacity, and means for urging said further piston into said minimum-volume position.

5. The apparatus defined in claim 4, further comprising an overflow conduit having an end opening into said intake compartment at a location covered by said further piston in said minimum-volume position and uncovered by said further piston in said maximum-volume position.

6. The apparatus defined in claim 5, further comprising a return conduit connected between said overflow conduit and said intake opening and means for heating said return conduit.

7. The apparatus defined in claim 6 wherein said housing is formed opposite said intake opening with a secondary outlet opening, said return conduit being connected to said secondary outlet opening and being provided with a valve between said secondary outlet opening and said overflow conduit.

8. A method of filling containers with a viscous mass, comprising the steps of:
- feeding said viscous mass from an intake compartment into a rotating cylinder having an aperture registrable with said intake compartment by displacing a piston axially in said cylinder to accommodate the mass therein;
- simultaneously and synchronously rotating another cylinder previously filled with said mass to communicate the same with a discharge compartment, and driving the mass out of said other cylinder into said discharge compartment by displacing a respective piston axially therein;
- filling a container with the material from said discharge compartment; and
- continuously rotating said cylinders and alternately operating said pistons to communicate said cylinders alternately between said intake compartment and said discharge compartment and alternately draw said mass into said cylinders and displace said mass out of said cylinders into said discharge compartment while maintaining a substantially constant flow of said mass into and from said intake compartment.

* * * * *